United States Patent [19]
Kikuchi

[11] Patent Number: 5,255,385
[45] Date of Patent: Oct. 19, 1993

[54] METHOD OF TESTING PROGRAM, AND COMPILER AND PROGRAM TESTING TOOL FOR THE METHOD

[75] Inventor: Sumio Kikuchi, Machida, Japan

[73] Assignee: Hitachi, Ltd., Tokyo, Japan

[21] Appl. No.: 658,222

[22] Filed: Feb. 20, 1991

[30] Foreign Application Priority Data

Feb. 26, 1990 [JP] Japan .................................... 2-44827

[51] Int. Cl.⁵ .............................................. G06F 11/00
[52] U.S. Cl. .................................... 395/575; 395/700; 371/19
[58] Field of Search .................... 371/19; 395/575, 700

[56] References Cited

U.S. PATENT DOCUMENTS

| | | | |
|---|---|---|---|
| 4,956,800 | 9/1990 | Kametani | 364/736 |
| 5,067,068 | 11/1991 | Iwasawa et al. | 395/650 |
| 5,088,034 | 2/1992 | Ihara et al. | 395/700 |
| 5,151,991 | 9/1992 | Iwasawa et al. | 395/700 |

OTHER PUBLICATIONS

Orlie Brewer, et al., "Tools to Aid in the Analysis of Memory Access Patterns for FORTRAN Programs", Parallel Computing 9, 1988/89, pp. 25–35.

Primary Examiner—Charles E. Atkinson
Attorney, Agent, or Firm—Fay, Sharpe, Beall, Fagan, Minnich & McKee

[57] ABSTRACT

A method of testing a source program includes the steps of converting the source program into a load module while dividing statements of the source program associated with access to same data into a plurality of processes, executing the load module while generating access information representing a process defining the data or a process using the data each time the data is accessed, and determining in accordance with said access information whether or not the using process coincides with the defining process or whether or not the use by the using process precedes the definition by the defining process.

57 Claims, 15 Drawing Sheets

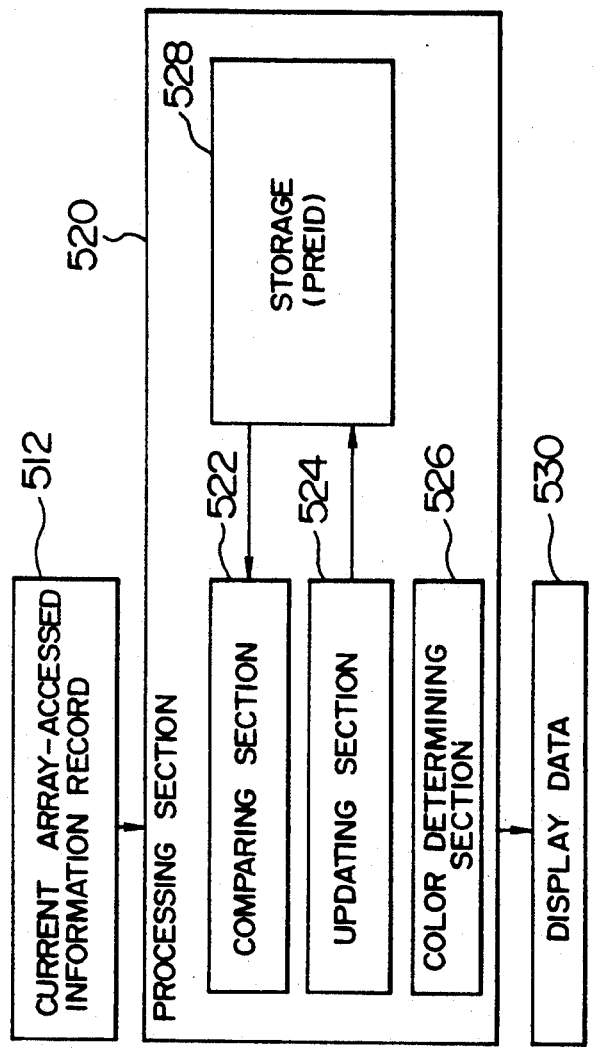

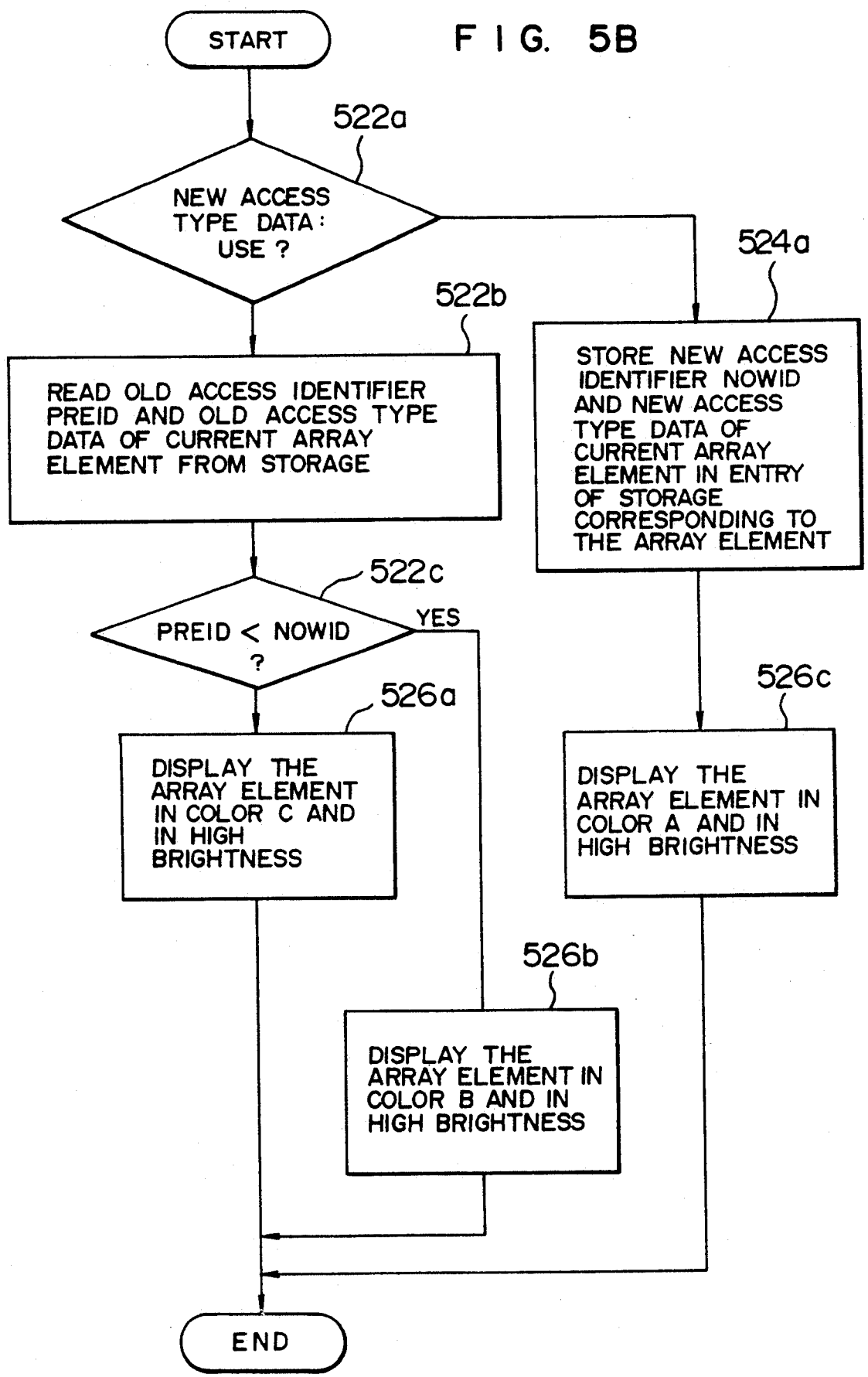

FIG. 6
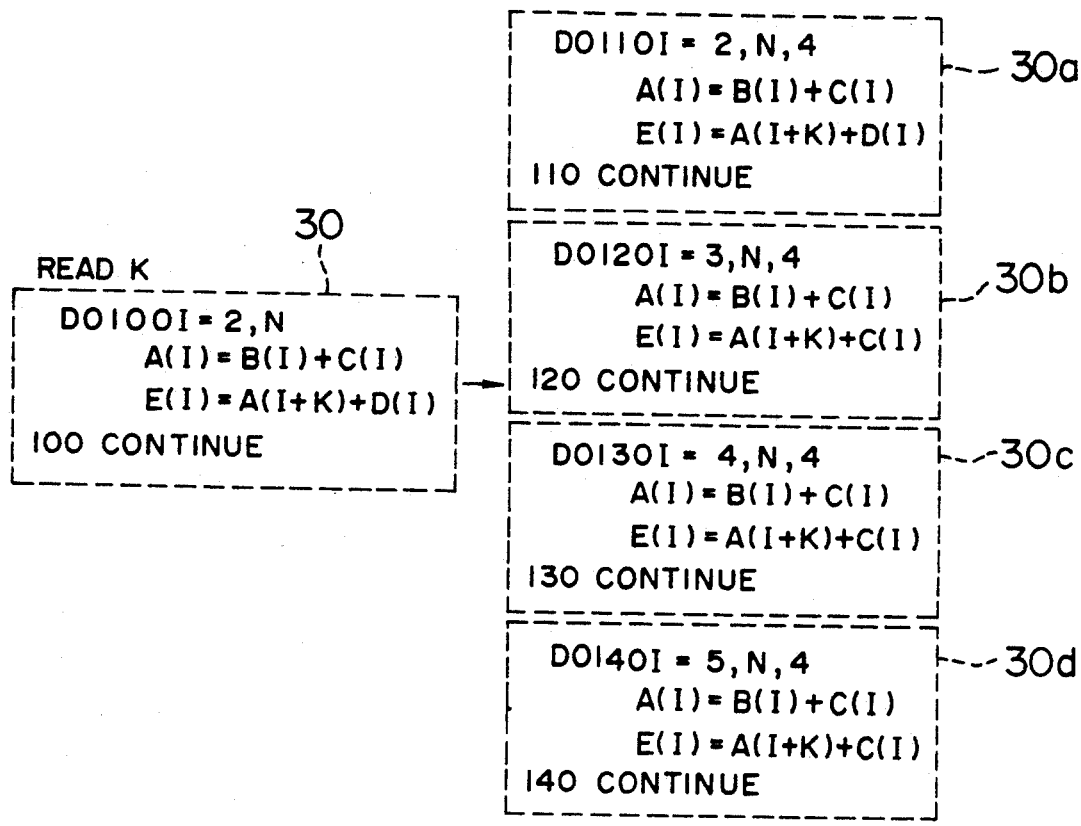
FIG. 7A  LOOP 30 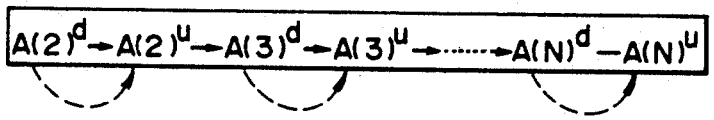
FIG. 7B  LOOP 30a 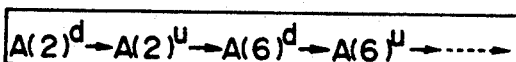
FIG. 7C  LOOP 30b 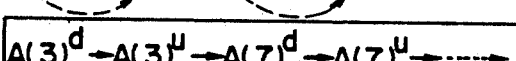
FIG. 7D  LOOP 30c 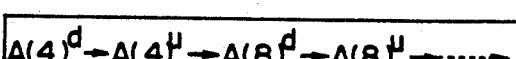
FIG. 7E  LOOP 30d 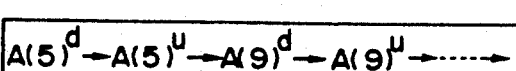

FIG. 8
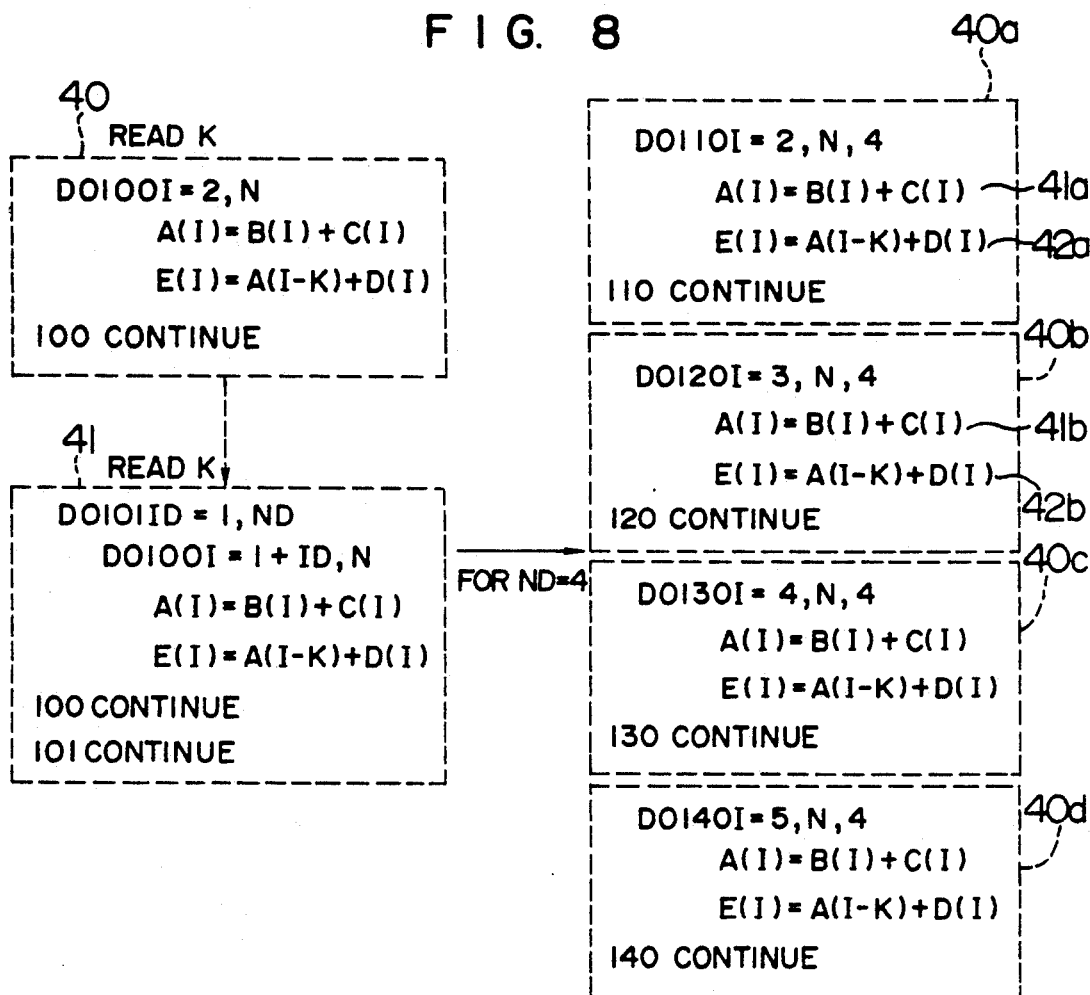
FIG. 9A  LOOP 40a  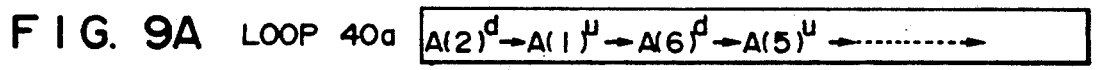
FIG. 9B  LOOP 40b  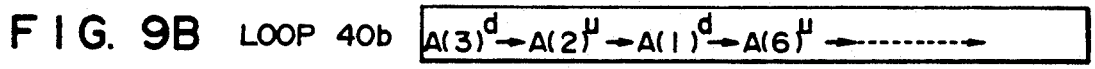
FIG. 9C  LOOP 40c  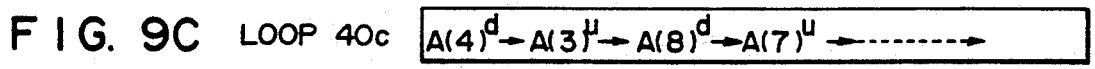
FIG. 9D  LOOP 40d  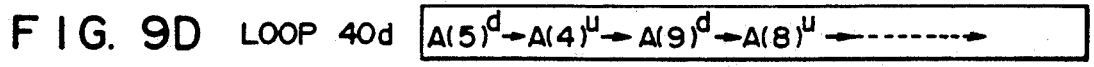

FIG. 17
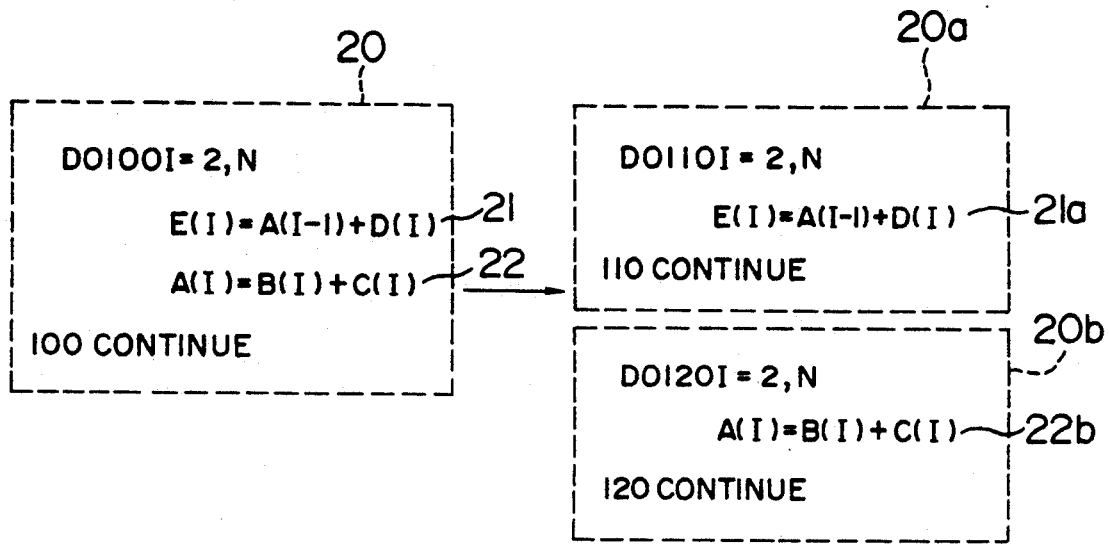
FIG. 18A  LOOP 20 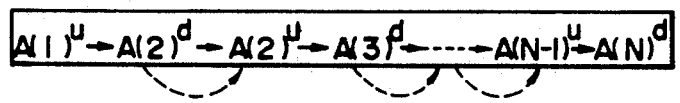
FIG. 18B  LOOP 20a 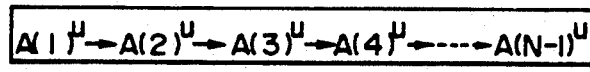
FIG. 18C  LOOP 20b 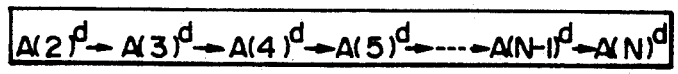

FIG. 19
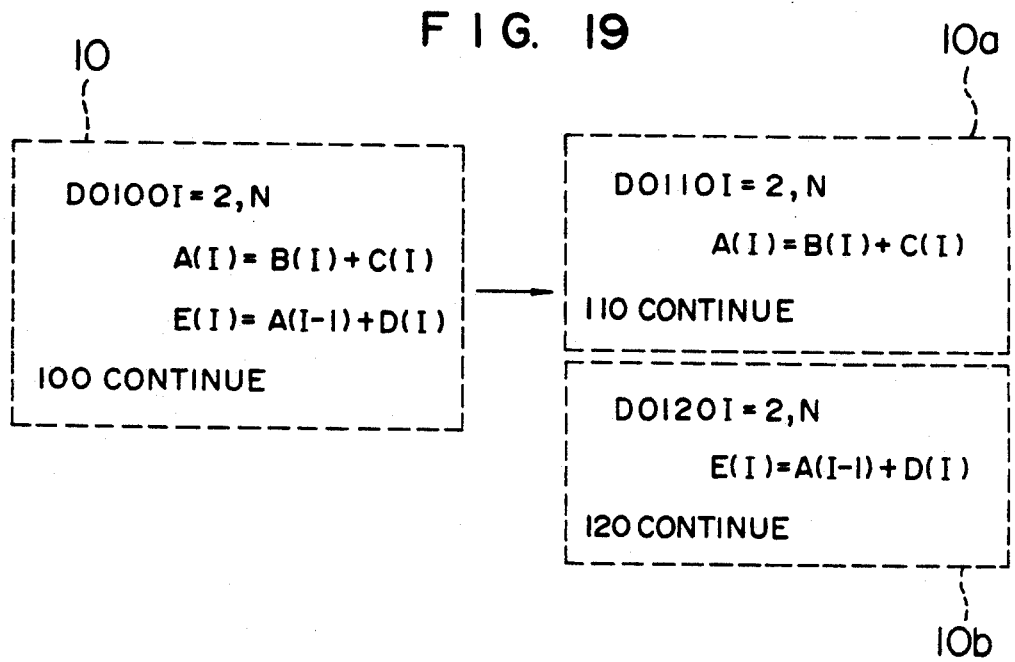
FIG. 20A  LOOP 10
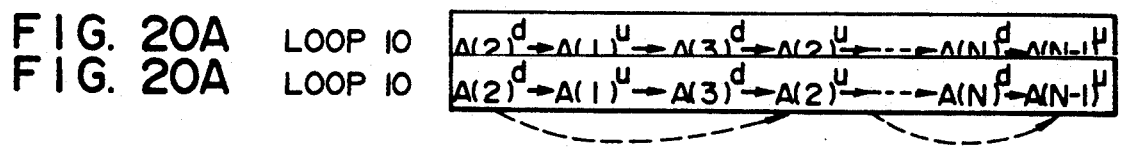
FIG. 20B  LOOP 10a
FIG. 20C  LOOP 10b
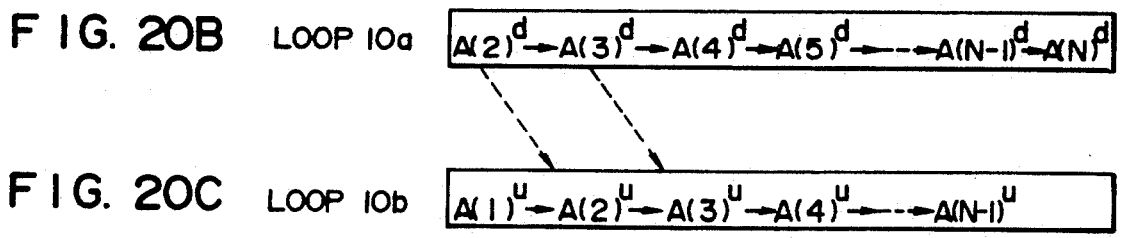

F I G. 21A
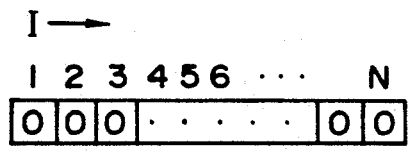
F I G. 21B
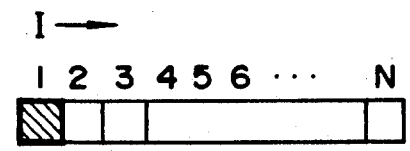
F I G. 22A
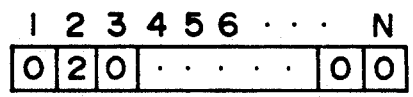
F I G. 22B
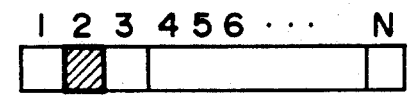
F I G. 23A
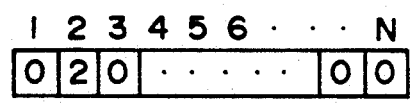
F I G. 23B
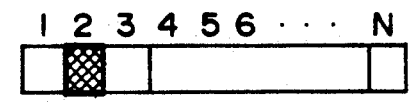
F I G. 24A
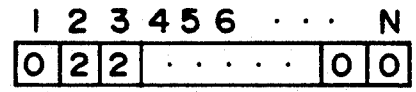
F I G. 24B
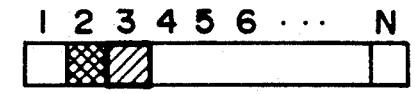

METHOD OF TESTING PROGRAM, AND COMPILER AND PROGRAM TESTING TOOL FOR THE METHOD

BACKGROUND OF THE INVENTION

Field of the Invention

This invention relates to a program testing method and a program testing tool and a compiler for the method.

Particularly, the invention relates to a method of testing a source program by detecting the possibility of erroneous access to array data upon execution of a load module corresponding to the source program for parallel processing or vector processing, and to a program testing tool and a compiler useful for executing the method.

Description of the Related Art

One of the causes of faults encountered frequently upon executing a user program on a parallel processor system or vector processor system is the erroneous access to array data, i.e., disorder between definition and use. In a compiler with the function of automatically finding portions of a sequential execution source program which is executable by a parallel processor system or vector processor system, array data is analyzed to determine whether or not the definition and use of the definition for the same element are excluded by the same loop iteration. And, the source program can be determined to be parallelized or vectorized.

But this determination cannot be performed during compilation when an array subscript includes a variable whose value is determined at the time of execution. In this case, the compiler cannot determine if the source program can be parallelized or vectorized. However, the above determination can be performed during the compilation. In these cases the determination is performed in accordance with a designation from a user in general, but this method often results in a faulty execution due to an erroneous designation from the user.

A description error by the user often arises with a program written in a language which can describe the parallel processing. Although this error may be detected through checking the access relationship of array data by the compiler, the analysis at compiling does not cover all cases, leaving possible events of faulty execution.

A conventional method of checking and displaying an access pattern to array data when a user program is executed is discussed in the publication, "Parallel Computing 9 (1988/89) 25-35". This method is intended for testing an algorithm oriented to a high-performance computer. In the method, the accessing order of definition and use of array data when a program for sequential execution is executed is displayed in separate windows. However, in the method, no consideration is made for a program executed on a parallel processor system or vector processor system, i.e., checking the possibility of erroneous access to array data in view of debugging. Therefore, there is needed a method of testing the adaptability of the program for the parallel processing or vector processing by checking the access relationship of array data. In addition, there needs to be a method of displaying the testing result properly, and a program testing tool and compiler for the method.

Generally, a program designed to be run on a parallel processor system or vector processor system is debugged using it as a target processor system. However, a problem exists since using such a high-performance processor system for debugging the program lowers the use efficiency of the processor system.

SUMMARY OF THE INVENTION

A first object of this invention is to provide a method of testing the adaptability of a source program for parallel processing or vector processing by checking the access relationship of array data when a corresponding load module is executed.

A second object of this invention is to provide a method of displaying the test results properly for easy understanding.

A third object of this invention is to provide a compiler for compiling a source program which is to be run on a parallel processor system or vector processor system.

In order to achieve the objects, a method of testing a source program comprises the steps of:

converting the source program into a load module while dividing statements of the source program associated with access to same data into a plurality of processes;

executing the load module while generating access information representing a process defining said data or a process using said data each time said data is accessed; and determining in accordance with said access information whether or not said using process coincides with said defining process or, whether or not the use by said using process precedes the definition by said defining process.

As apparent from the above, according to the present invention, the possibility of erroneous access to array data can be detected as one of the causes of fault when a load module corresponding to a program which is to be run on a parallel processor system or vector processor system is executed. Therefore, the adaptability of the program for parallel processing or vector processing can readily be tested.

In addition, in a case of parallelizing or vectorizing a program for sequential execution for purposes of enhancing the performance of a processor system, the above-mentioned program testing method can be used for examining array data which hampers the parallelization or vectorization. Therefore, if there is any array data unfavorable for the parallelization or vectorization, countermeasures such as the alteration of the algorithm can be taken.

Further, according to the present invention, the testing result of program can be displayed on a screen, so that a user can visually understand it.

Furthermore, the compiler for a source program for a parallel processor system or vector processor system can be provided. Therefore, the test of a source program can be further facilitated.

BRIEF DESCRIPTION OF THE DRAWINGS

FIG. 3 is a diagram showing a data format of a array-accessed information file;

FIG. 4 is a functional block diagram of a processing section;

FIGS. 5A and 5B are a flowchart showing an operation of the processing section;

FIG. 6 is a diagram showing a program which is designed to be run on a parallel processor system;

FIGS. 7A to 7E are diagrams showing access relationship of the array A in a loop of FIG. 6;

FIG. 8 is a diagram showing another program which is designed to the run on the parallel processor system;

FIGS. 9A to 9D are diagrams showing access relationship of the array A in a loop shown in FIG. 8;

FIGS. 11A, 11B, 12A, 12B, 13A, 13B, 14A, 14B, 15A, 15B 16A, and 16B are diagrams showing the contents of a storage and display data on a screen;

FIG. 17 is a diagram showing a program which is designed to be run on a vector processor system;

FIGS. 18A to 18C are diagrams showing access relationship of the array A in a loop of FIG. 17;

FIG. 19 is a diagram showing another program which is designed to be run on the vector processor system;

FIGS. 20A to 20C are diagrams showing access relationship of the array A in a loop of FIG. 19; and FIGS. 21A, 21B, 22A, 22B, 23A, 23B, 24A, and 24B are diagrams showing the contents of the storage and display data on the screen.

DESCRIPTION OF THE PREFERRED EMBODIMENTS

Figure 1A:
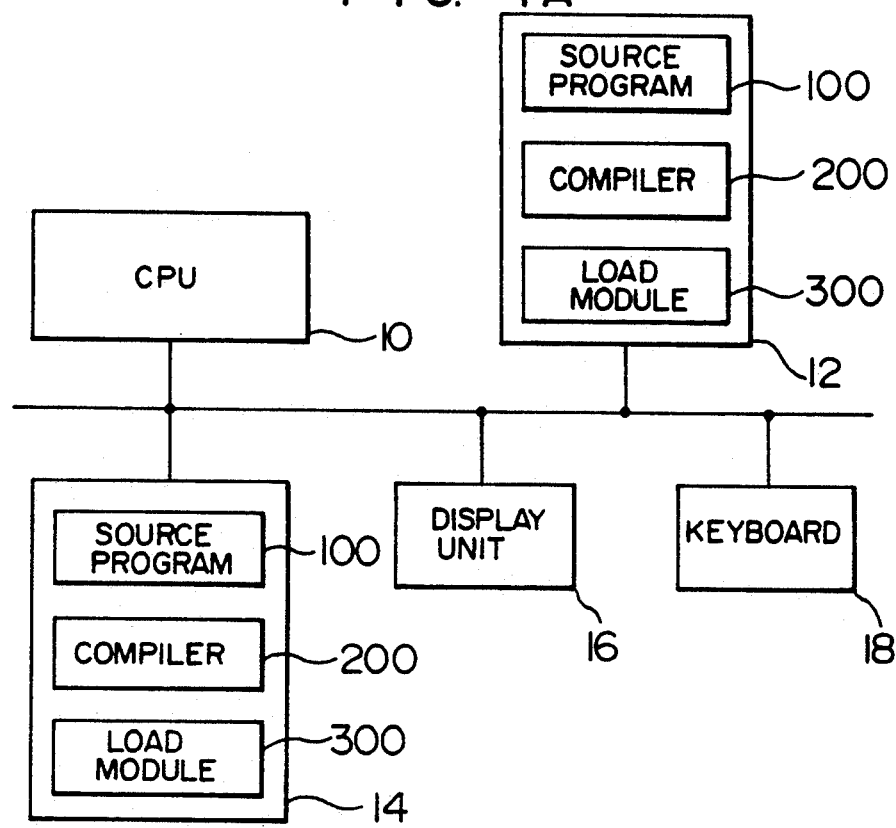
FIGS. 1A and 1B are block diagrams showing a computer system to which the present invention is applied.

The present invention will be described below in detail with reference to the accompanying drawings.

First, the features of the present invention will be described in brief.

There is the first viewpoint of the features of the present invention, from which numbers are assigned to parallel processes of a program when an array element is defined and is compared with a parallel process number assigned when the array element is used. The possibility of erroneous access to the array element is determined in accordance with whether or not both numbers coincide. Also, in a case of including plural statements to defined the same array element among plural loop portions, the most recent definition cannot be determined.

After executing a parallel loop, an array element value might be different. In this manner, the possibility of parallel processing of the program can be tested.

There is the second viewpoint of the features of the present invention from which vector statement numbers are assigned to vector processing units of a program in an order, a vector statement number when an array element to be tested is defined is compared with a vector statement number when the array element is used, and the possibility of erroneous access to the array element is determined in accordance with which of both the numbers is larger. In this manner, the possibility of vector processing of the program can be tested.

There is the third viewpoint of the features of the present invention, from which display areas corresponding to array elements are arranged in one- or two-dimensional matrix manner, and data indicative of the possibility of erroneous access to an array element can be displayed in a corresponding display area.

From the fourth viewpoint of the features of the present invention, there are provided a program testing tool and a compiler which makes it possible for the program testing tool to get array-accessed information records, each of which includes access type data for distinguishing which definition or use access to an array element are subscript values, and a parallel process number or vector statement number at which the array element has been accessed. A parallel process number or vector statement number assigned when the array element is defined is compared with a parallel process number or vector statement number when the array element is used, to thereby test the possibility of parallelization or vectorization of the program.

For the parallel processing to be possible, it is necessary that the same processing results can be obtained even if parallel processes are executed in an arbitrary order. Namely, each array element needs to be defined and used in the same parallel process. By detecting the coincidence between the parallel process numbers upon both the definition and the use, it is possible to detect the possibility of erroneous access to an array. Namely, the adaptability of a program for the parallel processing can be tested from the above-mentioned first viewpoint.

Since the order of accessing array elements in the vector processing corresponds with that of the vector statement numbers, in order that the definition precedes the use, a vector statement number in use of an array element needs to be greater than that in definition of the array element. By comparing the vector statement numbers in both the definition and the use to each other, it is possible to test the possibility of erroneous access to an array. Namely, the adaptability of the program for the vector processing can be tested from the above-mentioned second viewpoint.

In the trace data displaying method according to the above-mentioned third viewpoint, the possibility of erroneous access to each array element can be displayed in a matrix manner on a screen. This allows a user to easily and visually find at a glance which array element obstructs the parallel processing or vector processing.

The program testing tool and the compiler from the above-mentioned fourth viewpoint can be executed on a sequential processor system, and it is possible to debug, using such a sequential processor system, a source program which is to be run on a parallel processor system or vector processor system.

Next, embodiments of the present invention will be described with reference to the drawings. It should be noted that the present invention is not limited to these embodiments.

FIG. 1A shows an arrangement of a sequential processor system used to translate a source program into a load module. The sequential processor system includes a CPU 10, a memory 12, an external storage unit 14, a display unit 16 and a keyboard 18. The external storage unit 14 stores a source program 100 and a compiler 200 according to the present invention.

Figure 2A:
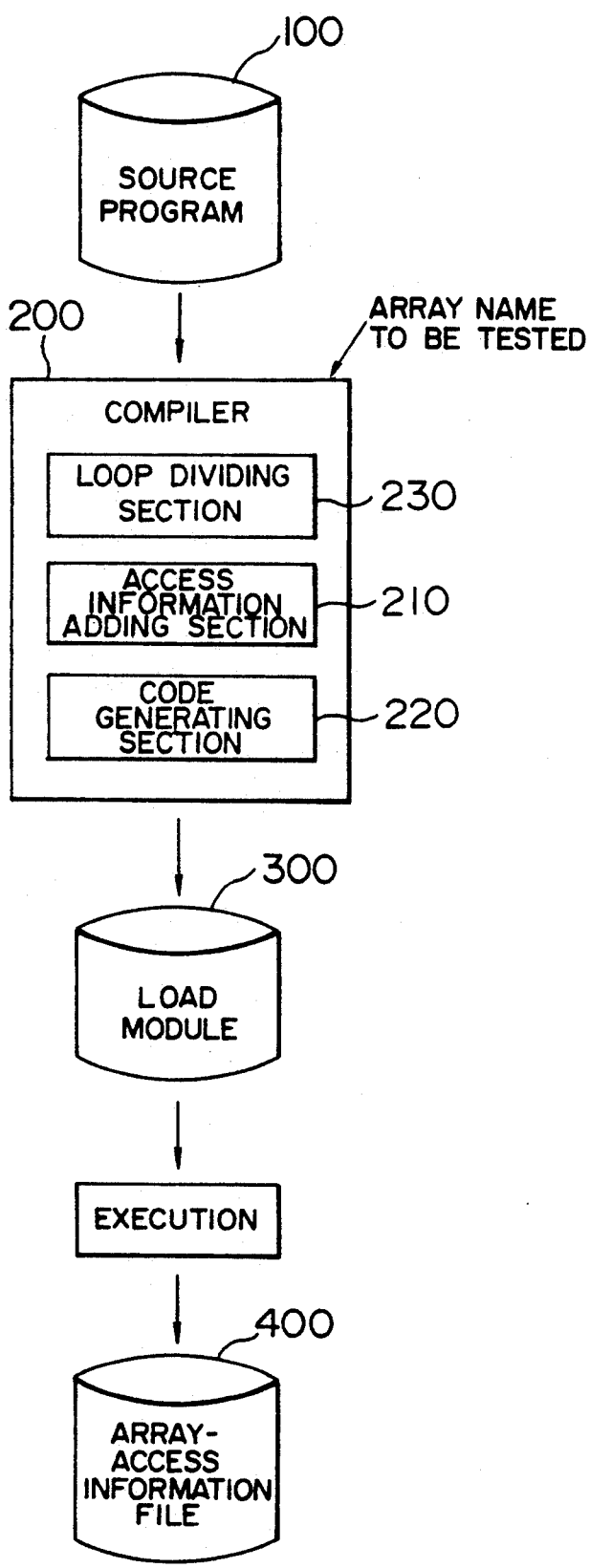
FIG. 2A is a conceptual diagram for explaining a compiler according to a first embodiment of this invention.

FIG. 2A is a functional block diagram of the sequential processor system. The source program 100 and the compiler 200 stored in the unit 14 are loaded into the memory 12. The compiler 200 is executed by the CPU 10 so that the source program 100 depending upon the array names to be tested which the user has inputted, is compiled into an object program and then a load module 300 is generated from the object program and stored in the memory 12. Thereafter, the load module 300 is stored back to the unit 14.

The compiler 200 has an access information adding section 210 and a code generating section 220. In access of a source program 100 for parallel processing, for debugging by using the sequential processor system, the source program is divided into plural sub-loops by a loop dividing section 230 during the compilation, and the section 210 assigns an access identifier to each parallel process. The section 210 also assigns access type data representative of definition or use to each statement for accessing a target array to be tested, which is directed by a user, in each parallel process. For example, the compiler 200 compiles a loop 40 shown in FIG. 8 into a loop 41, and subsequently divides the loop 41 into sub-loops 40a to 40d by setting the number of division ND for the parallel processing to be 4. Thereafter, the compiler assigns an access identifier #1 to a portion of an array A defined by a statement 41a in the sub-loop 40a and access type data of definition to the statement 41a. Also, the compiler assigns access type data of use to a statement 42a. Similarly, the compiler assigns access identifiers #2, #3 and #4 to portions of the array A defined and used in the sub-loops 40b, 40c and 40d, respectively. It should be noted that parallel process numbers may be assigned to the above sub-loops as their access identifiers.

The code generating section 220 generates an object code group for outputting array-accessed information records to an array accessed information file 400 each time the array is accessed, i.e., each element of the array is defined or used, and the generated object code group is added to the load module 300. The object code group may be generated and added to the object program during compilation. Each array-accessed information record includes, in addition to the access identifier, values and subscripts of an accessed array element and a corresponding statement number of the source program.

Accordingly, when execution of the load module 300 is completed, an array-accessed information file 400 including the generated array-accessed information records is generated with respect to the array data A and stored in a storage unit 26. The array-accessed information file 400 has its records formatted as shown in FIG. 3. In the figure, field 410 stores an access number indicating order in which an elements of the array data are accessed. In fields 420, 430 and 440 are stored the access type data, subscript values of the accessed array element in unit of dimension, and the access identifier, respectively. In fields 450 and 460 are stored a statement number of the source program and values of the accessed array elements, respectively. The file 400 is transferred from the unit 26 to the unit 14 of the sequential processor system, in the memory 12 of which a trace data displaying tool 500 (not shown in FIG. 1A) including a program testing tool according to the embodiment of the present invention is stored, and is utilized when the tool 500 is executed. Consequently, the parallel processor system can be used for other processes.

Figure 2B:
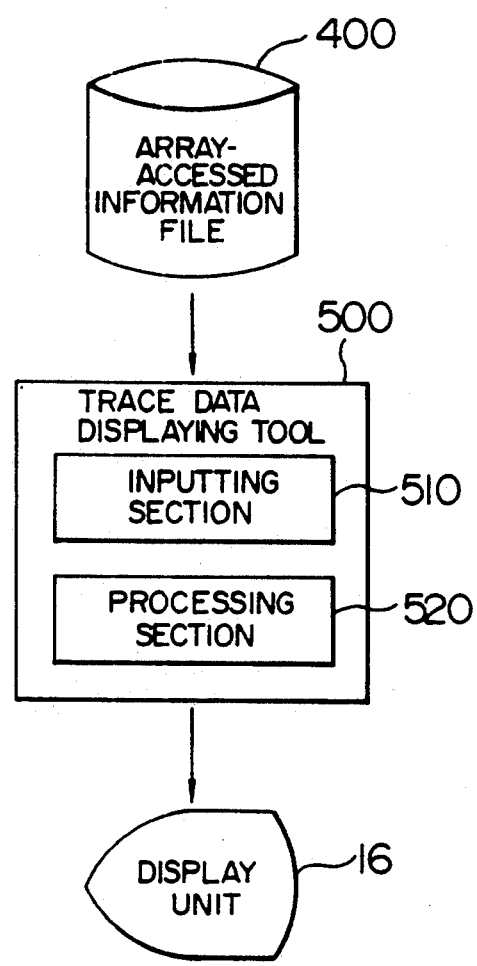
FIG. 2B is a conceptual diagram for explaining a trace data displaying tool according to the first embodiment of this invention.

FIG. 2B shows the trace data displaying tool 500, which includes an inputting section 510 and a processing section 520. The inputting section 510 sequentially inputs the records of the file 400 one by one in accordance with the access number in the field 410 of the previously inputted record and transfers the inputted record to the section 520. The section 520 includes an access identifier comparing section 522, an access identifier information updating section 524, a display color determining section 526, and an access identifier storage 528, as shown in FIG. 4. The storage 528 has entries in correspondence to the array elements and stores in the corresponding entries the access identifiers of accessed array elements and the access types of the accessed array elements. The stored access identifier is represented as "PREID", and it has an initial value of zero, where as the access identifier of the inputted record is represented as "NOWID".

Figure 5A:
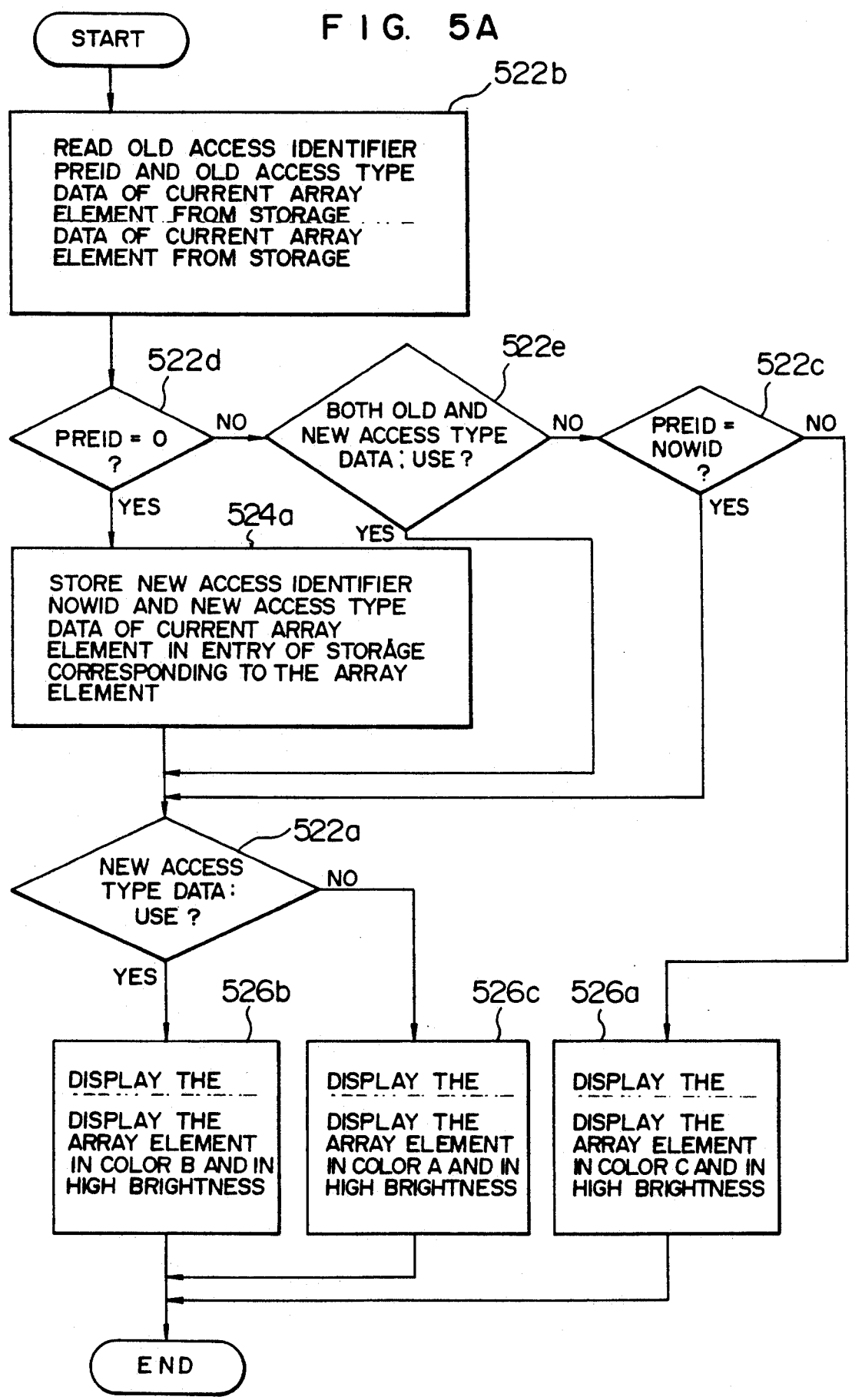

The section 520 operates for a program for a parallel processor system, in accordance with the flowchart shown in FIG. 5A. In these flowcharts, steps 522a to 522e are implemented by the comparing section 522, step 524 by the updating section 524, and steps 526a to 526c by the determining section 526.

Next, an operation of the trace data displaying tool for a program for a parallel processor system will be explained in connection with FIG. 5A.

At first, the concept of the program testing tool including the trace data displaying tool will be explained in connection with FIGS. 6 through 9D. This is the example of debugging by using the sequential processor system.

A loop 30 shown in FIG. 6 is divided into sub-loops 30a to 30d for parallel processing and the resulting sub-loops are executed in parallel. In this loop, there is an array element A (I+K) whose subscript value cannot be determined at the compiling time because the K's value (=0) is determined by the read statement.

But, at the time of execution, the K's value is determined upon the execution of the read statement, so that the subscript value I+K is I. In this case, if the definition and use of an array element are executed by the different sub-loops, there is the possibility of erroneous access to the array element, since the sub-loops are not necessarily executed simultaneously depending on the running state of each processor.

FIGS. 7A to 7E show the relationship of the definition and use of elements of an array A in the loop 30 and the sub-loops 30a to 30d. A notation $A(I)^d$ represents the definition of an array element $A(I)$, while a notation $A(I)^u$ represents the use of the array element $A(I)$. As apparent from the figures, in loop 30 and sub-loops 30a to 30d, each element of the array A is defined and used within the same loop and does not have a relation with another loop. Hence, the loop 30 can be executed correctly by the parallel processor system.

The execution of a loop 40 shown in FIG. 8 show parallel execution of its divided sub-loops 40a to 40e. Also, in this case, the K's value (=0) is determined based on the read statement at the time of execution. FIGS. 9A to 9D show the relationship of definition and use of elements of the array A in the loop 40 and the sub-loops 40a to 40d. In this case, the same element is defined and used in different loops. Therefore, there is a possibility of erroneous access in the parallel execution.

Generally, when the subscripts for designating each array element are complicated and includes a variable whose value is determined upon execution of a program, the access relation cannot be known until the program is actually executed and therefore it is not easy to judge whether the program can be executed correctly by the parallel processor system. In this case, the access relationship can readily be checked by dividing an objective portion of the program, e.g., dividing the loop into parallel processing units which are rearranged in an arbitrary order, converting the rearranged program into a load module, and executing the load module on a sequential processor system to thereby check whether the definition and use of each array element is executed in the same parallel processing unit or in different parallel processing units. In other words, by checking whether or not the parallel process number, i.e., a number assigned to the parallel processing unit upon the use of each array element coincides with a parallel process number of the definition, it is possible to test the possibility of parallel processing of the program.

Similarly, in a case of plural definitions of the same array element, it is possible to test the possibility of parallel execution to check whether or not the access identifier of each definition is the same processing number.

In step 522b of FIG. 5A, an old access identifier PREID and an old access type are read from an entry of the access identifier storage 528 corresponding to the entered array element to be processed, i.e., with the same subscript.

In step 522d it is judged whether or not the identifier PREID is equal to zero. If PREID=0, i.e., the value of the array element which is being processed currently is not yet defined nor used, the processing proceeds to step 524a. If PREID is not zero, i.e., the value of the array element which is being processed currently has already been defined or used, the processing proceeds to step 522e. In step 522e it is judged whether or not the old and new access types are both uses. If the types are both uses, the processing proceeds to step 522a, and if either type is not use, the processing proceeds to step 522c. In step 522c it is judged whether or not the new access identifier NOWID and the old access identifier PREID of the array element which is being processed currently are the same. If they are different, the processing proceeds to step 526a, and if the are the same, the processing proceeds to step 522a.

In the step 524a, the access identifier NOWID and the access type of the array element which is being processed currently are stored in a corresponding entry of the storage 528, and then the processing proceeds to step 522a. In step 522a there is detected the access type of the array element which is being processed currently. If the type is definition, the processing proceeds to step 526c, and if the type is use, the processing proceeds to step 526b.

In step 526a it is determined that the array element which is being processed currently is displayed in a color C and in high brightness for a short time. The color C indicates that the access identifier of the array element upon the use does not coincides with that upon the definition, i.e., the array element has a possibility of erroneous access. Display in highbrightess for a short time is to indicate that the array element is being processed currently. In step 526b it is determined that the array element which is being processed currently is displayed in a color B and in high brightness for a short time. The color B indicates that the array element is used. In step 526c it is determined that the array element which is being processed currently is displayed in a color A and in high brightness for a short time. The color A indicates that the array element is defined.

Figure 10:
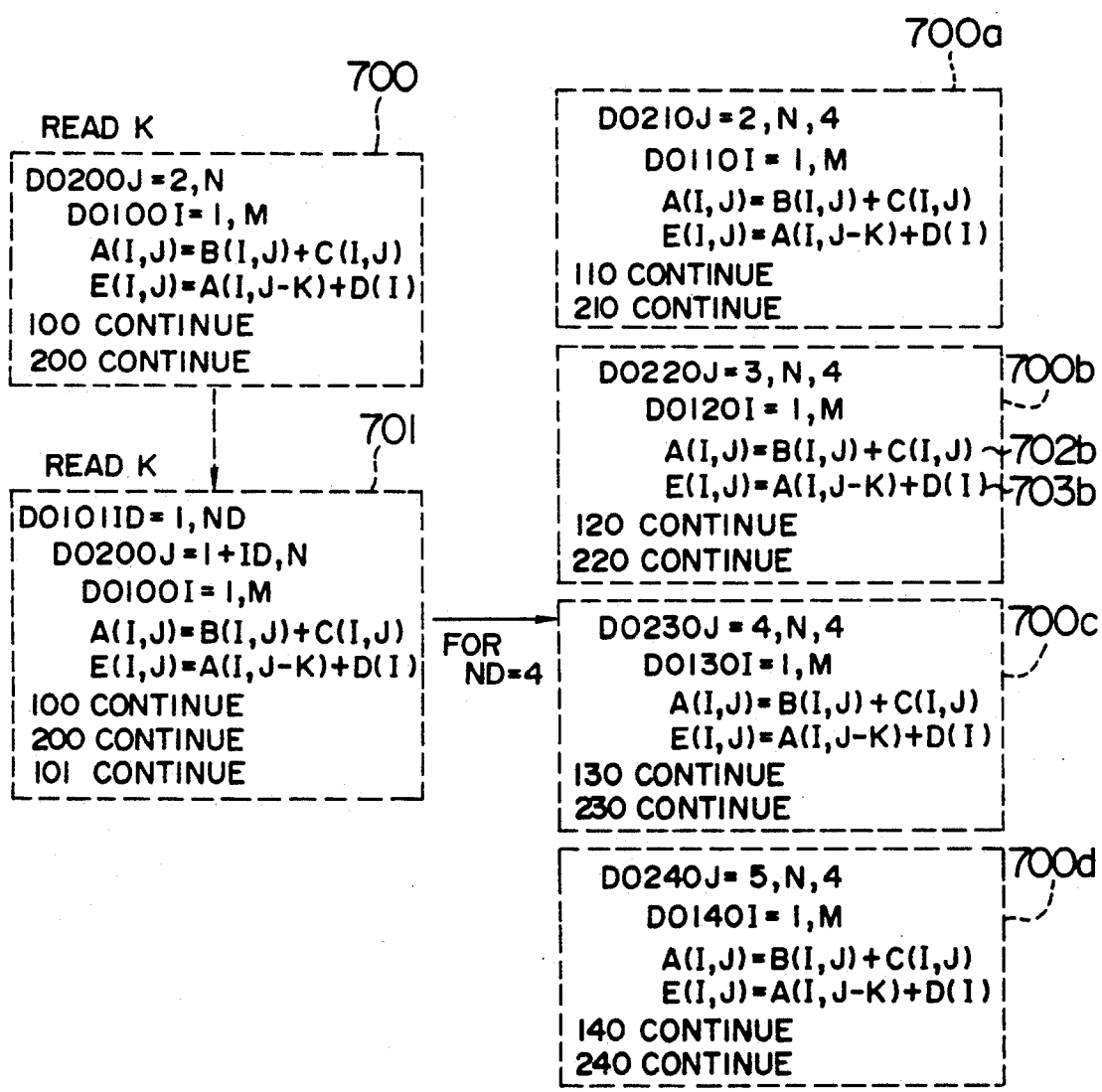
FIG. 10 is a diagram showing another program which is designed to be run on the parallel processor system.

The above-mentioned operation will be explained in more detail in connection with a loop 700 shown in FIG. 10.

In this case, the subscript value J-K of the array element A(I, J-K) cannot be determined at the time of compilation. However, upon the execution of the read statement, K is 0, so that J-K is equal to J.

For parallelization of the loop 700 of "DO 200", it is converted to a loop 701 using the number of division ND, where the number ND is to be "4" for the explanatory purpose. The sub-loops 700a to 700d are generated from the loop 701 to match to the loop 701. An array element to be tested is assumed to be A(I, J-K).

Figures 11A, 11B, 12A, 12B, 13A, 13B:
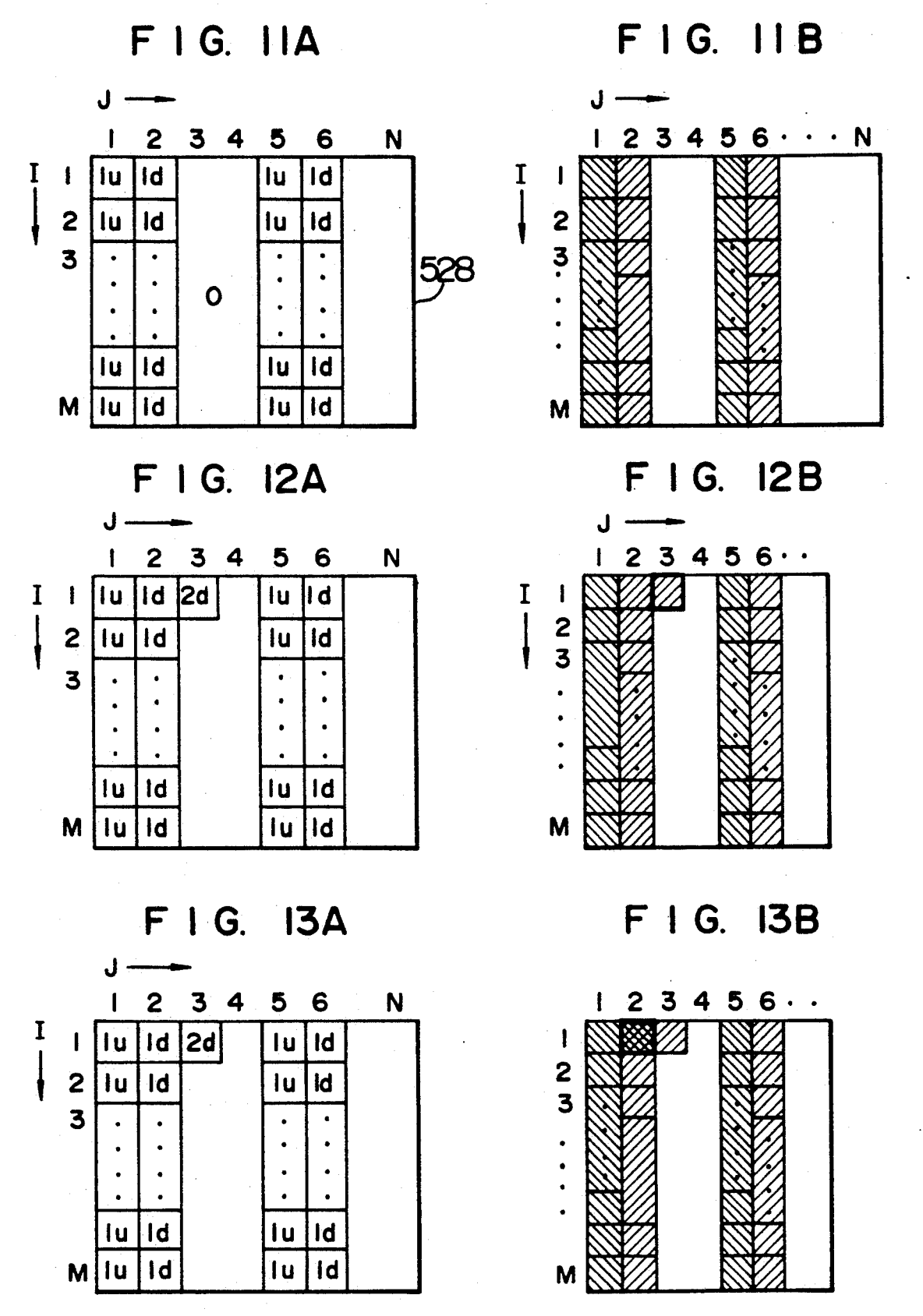

FIG. 11A shows the contents of the storage 528 upon the completion of execution of the first loop 700a. Since each of access identifiers in all the entries of the storage 528 is initialized to data "0", data "0" remains set in the entries corresponding to all array elements which have not been accessed upon the execution of the loop 700a. Whereas, data "1" is newly set in the entries corresponding to all array elements which have been accessed upon the execution of the loop 700a. Symbols d and u represent definition and use, respectively.

FIG. 11B shows the displayed screen during this operation. In the figure, the color A (defined element) is expressed by up-right hatching, the color B (used element) is expressed by down-right batching, and the color C (element of possibly erroneous access) is expressed by cross hatching. High brightness display is expressed by a bold frame.

FIGS. 12A and 12B show the contents of the storage 528 at the time of execution of the statement 702b with I=1 and J=3, and the corresponding displayed screen. The array element accessed during the execution of the statement 702b is A(1, 3), and accordingly in step 522b of FIG. 5A the access identifier PREID is read out from the entry (1, 3) of the storage 528. Since the initial value is zero, the processing proceeds from step 522d to step 524a. The array element A(1, 3) has an access type of "definition" and the access identifier NOWID is the parallel process number #2 of the loop 700b, then the access identifier "2" and access type "definition" are set in the entry (1, 3) of the storage 528. Subsequently in step 526c the element A(1, 3) is displayed in the color A and in high brightness for a short time.

FIGS. 13A and 13B show the contents of the storage 528 at the time of execution of the statement 703b with I=1 and J=3, and the corresponding displayed screen. The array element accessed during the execution of the statement 703b is A(1, 2), and accordingly in step 522b of FIG. 5A the old access identifier PREID=1 and the old access type "definition" are read out from the entry (1, 2) of the storage 528. Since the old access identifier PREID is not zero, the processing proceeds from step 522d to step 522e. The access identifier NOWID of the element A(1, 2) is a parallel process number #2 of the loop 700b and the access type is "use". Because the old and new access types are different from each other, the processing proceeds to step 522c.

In step 522c the new access identifier NOWID=2 is compared with the old access identifier PREID=1, and because of their inequality, the processing proceeds to step 526a. Subsequently, in step 526a the element A(1, 3) is displayed in the color A and in high brightness for a short time. The color C implies the possibility of erroneous access.

Figures 14A, 14B, 15A, 15B, 16A, 16B:
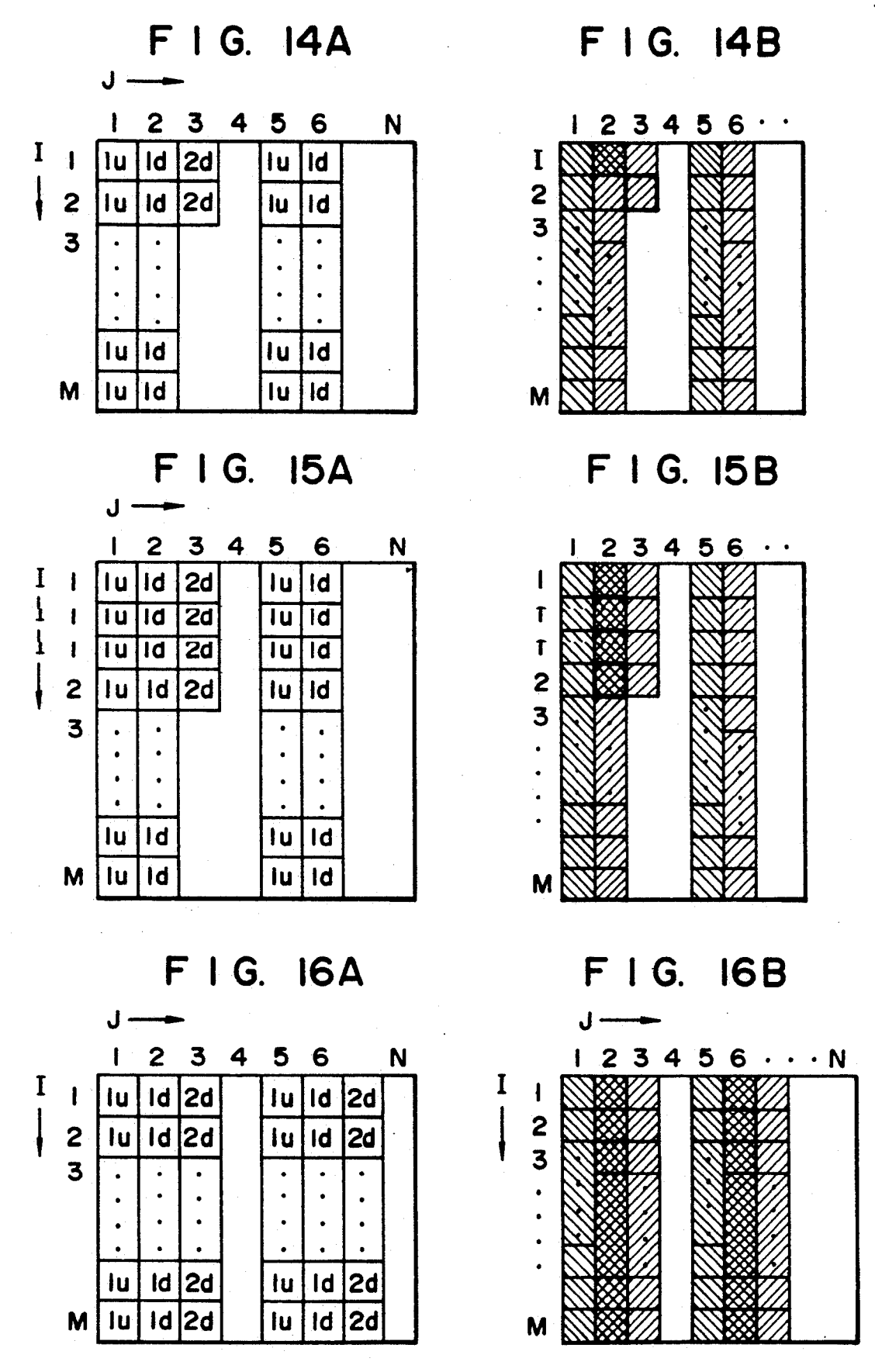

FIGS. 14A and 14B show the contents of the storage 528 at the time of execution of the statement 702b with I=2 and J=3, and the corresponding displayed screen.

FIGS. 15A and 15B show the contents of the storage 528 at the time of execution of the statement 703b with I=2 and J=3, and the corresponding displayed screen.

Similarly, when the processing of the loop 700b as a result of repetition of the same processing as described above, the contents of the storage 528 and the displayed screen are changed to states shown in FIGS. 16A and 16B. The element A(I, 2) and element A(I, 6) are displayed in the color C, which reveals clearly a possibility of erroneous access. Namely, since the definition and use for the same elements of the array A arise in different parallel processes, it is readily judged that the loop 700 cannot be executed in parallel.

The foregoing example is the case of two-dimensional array, allowing the whole array to be displayed on the two-dimensional screen. If the array is three-dimensional or higher, the user may select two dimensions and set specific values for the remaining dimensions. For example, for a three-dimensional array B(I, J, K), it is set to be B(I, 5, K) so that the access state of the array B can be displayed on a two-dimensional screen for a plane of J=5.

Figure 2C:
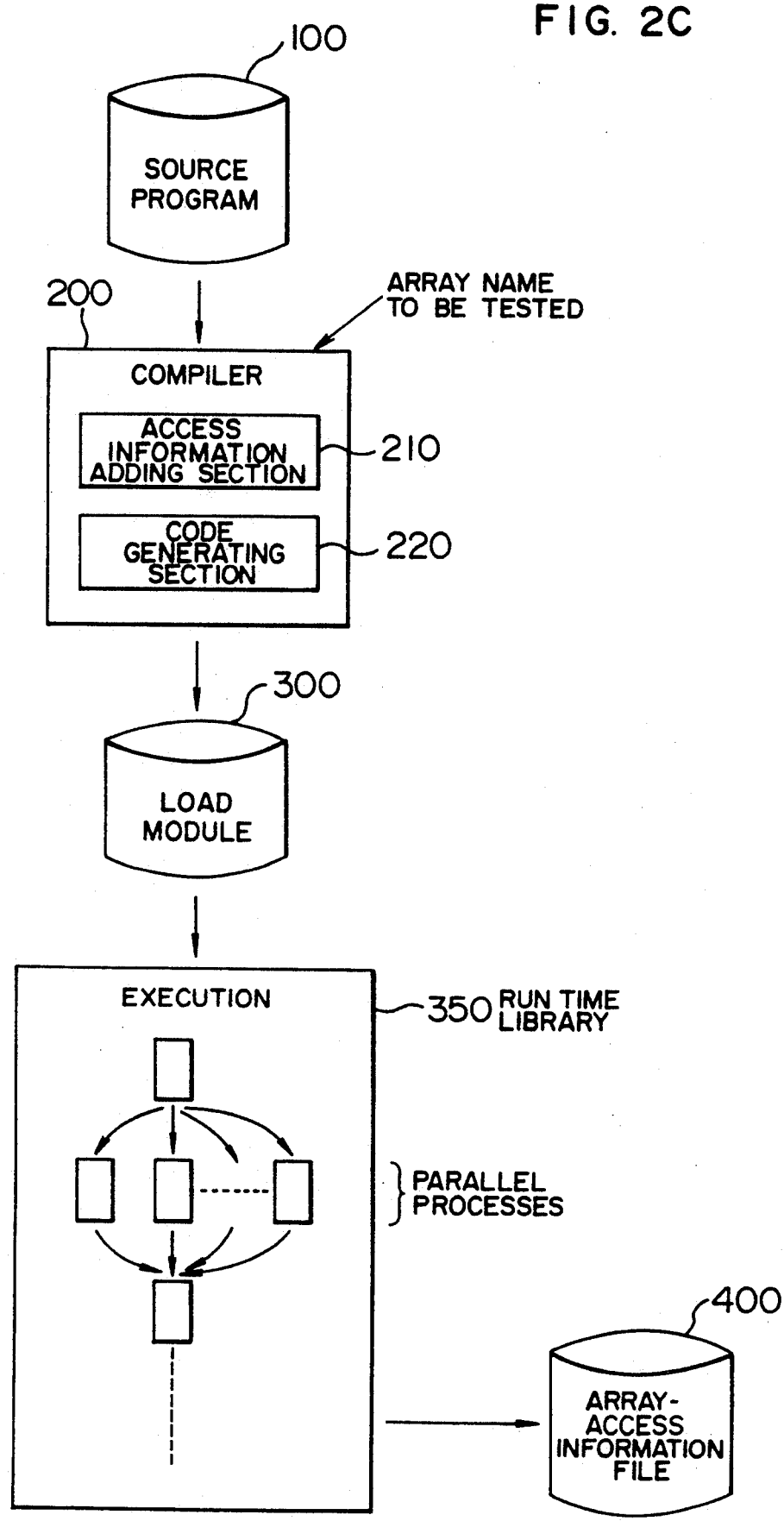
FIG. 2C is a conceptual diagram for explaining a compiler according to a modification of the first embodiment.

FIG. 2C is a functional block diagram of debugging using the parallel processor system, the compiler generates an object code to get the same array-accessed information by the section 210 as obtained when the sequential processor is used.

But a parallel processing executable portion of the load module is copied to a plurality of parallel processes during the execution 350, and the real process number is assigned to the access identifier.

By execution of the load module, array accessed information records are stored in the file 400.

The testing method is the same as shown FIG. 2B.

Figure 1B:
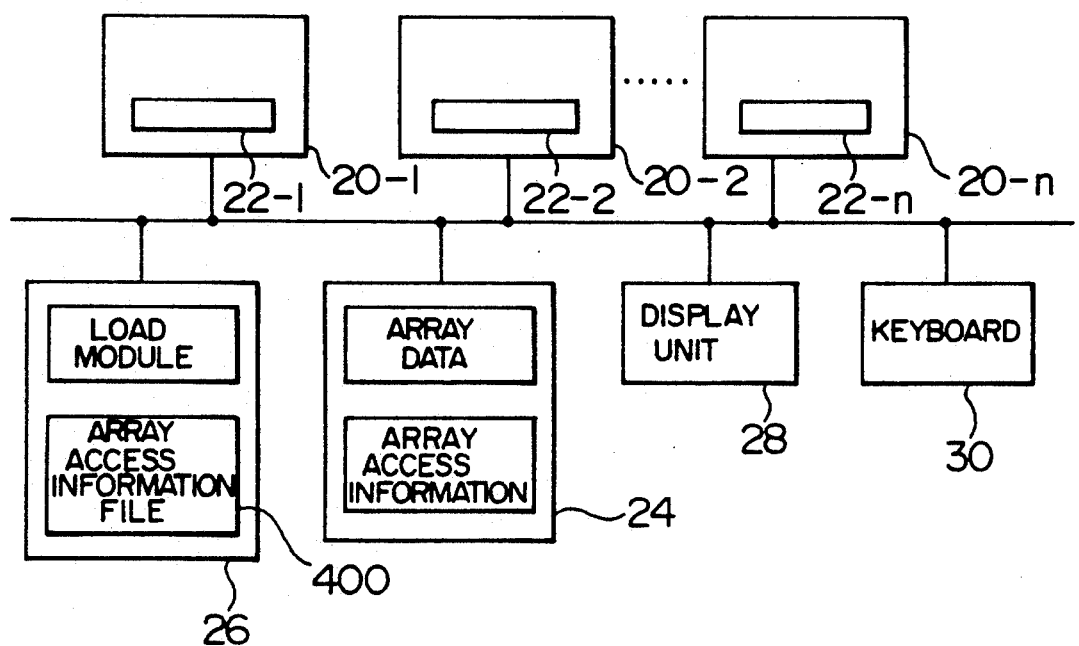

FIG. 1B shows the load module executed by the parallel processor system. Each parallel process is loaded into a processor 20-i (where i=1 to n), and when processing by a processor, e.g., 20-1, has reached a portion of the load module to be processed in parallel, the parallel processes are executed by the processors. At this time, when array data A stored in a data area of a shared memory 24 is accessed by each processor, the array-accessed information record is outputted from each processor in accordance with the object code group and stored in an array-accessed information area of the shared memory 24.

Next, another operation of the trace data displaying tool for a program for a vector processor system will be explained with reference to FIG. 5B.

At first, the concept of the method of testing such a source program will be explained in connection with FIGS. 17 to 20C. In this case of a source program 100 for the vector processor system, a loop to be processed is vectorized into vector processing by statement units indicating access to a target array, and an access identifier assigned to each vector processing unit by the section 210. For example, a loop 20 shown in FIG. 17 is divided into a loop 20a and loop 20b, with access identifiers #1 and #2 respectively assigned to the arrays A of the statements 21a and 22b in the loop 20a and 20b. At this time, the access identifiers are assigned to the array such that the access identifier of the definition is smaller than that of the use. It should be noted that the vector statement number may be assigned as the access identifier.

Execution of a loop 10 shown in FIG. 19 on the vector processor system is equivalent to execution of sub-loops 10a and 10b in this order, which are obtained by dividing the loop 10. Accordingly, whether or not the loop 10 can be executed correctly on the vector processor system can be judged on the basis of whether or not the relationship of definition and use of the array A in the loop 10 coincide with that of the array A upon execution of the sub-loops 10a and 10b in this order on the sequential processor system.

FIGS. 20A to 20C show the relationship of definition and use of the array A in the loop 10 and sub-loops 10a and 10b. In the loop 10, each element of the array A is defined first and then used, as shown in the figures as element $A(2)^d$ and $A(2)^u$ of array A. Whereas, in the sub-loop 10a, each element of the array A is only defined and in the sub-loop 10b, each element of the array A is only used. That is, the array A is defined first in the sub-loop 10a and then used in the sub-loop 10b, thereby retaining the same relationship as the loop 10. In conclusion, the loop 10 can be executed correctly on the vector processor system.

Execution of a loop 20 shown in FIG. 17 is equivalent to execution of sub-loops 20a and 20b in this order, which are obtained by dividing the loop 20. FIGS. 18A–18C show the relationship of definition and use of elements of the array A in the loop 20 and sub-loops 20a and 20b. In the loop 20, each element of array A is defined first and then used. Whereas, in the sub-loop 20a, each element of the array A is only used and in the sub-loop 20b, each element of array A is only defined. Namely, each element of the array A is used first in the sub-loop 20a and then defined in the sub-loop 20b. This relationship is different from that of loop 20. In this case, the execution of the loop 20 on the vector processor does not necessarily yield a correct result of computation.

As understood from the foregoing explanation, on the basis of comparison of the access identifier or the vector statement number (a number assigned to a vector processing unit, upon the definition of one array element with that upon the use), it is possible to test the possibility of vector processing for the program.

Referring back to FIG. 5B, in step 522a, the access type data of the entered array element which is being processed currently is checked, i.e., the current array element is checked whether it indicates the definition or the use. If the type data indicates the definition, the processing proceeds to step 524a, or if the type data indicates the use, the processing proceeds to step 522b.

In step 524a, the access identifier of the current array element, i.e., a new access identifier NOWID, is stored in the corresponding entry of the storage 528, and the processing proceeds to step 526c. In step 522b, an old access identifier PREID corresponding to the current array element is read out of the storage 528.

In step 522c it is judged whether or not the new access identifier NOWID is greater than the old access identifier PREID. If the judgement is affirmative, the processing proceeds to step 526b, otherwise to step 526a.

In step 526a it is determined that the current array element is displayed in a color C and in high brightness for a short time. In step 526b it is determined that the current array element is displayed in a color B and in high brightness for a short time. In step 526c it is determined that the current array element is displayed in a color A and in high brightness for a short time.

The above-mentioned operation will be explained in more detail in connection with the loop 20 shown in FIG. 17.

FIGS. 21A and 21B, and 22A and 22B show the contents of the storage 528 upon completion of execution of the statements 21 and 22 in the loop 20 with I=2, and the corresponding displayed screen, respectively. FIGS. 23A and 23B, and 24A and 24B show the contents of the storage 528 upon time of execution of the statements 21 and 22 in the loop 20 with I=3, and the corresponding displayed screen, respectively.

As a result of similar processing, the array element A(I) is displayed in the color C on the screen, which reveals clearly a possibility of erroneous access. Namely, the order of definition and use is different from that of the original loop, and it is readily judged that the loop 20 cannot be executed by the vector process system.

Figure 25A:
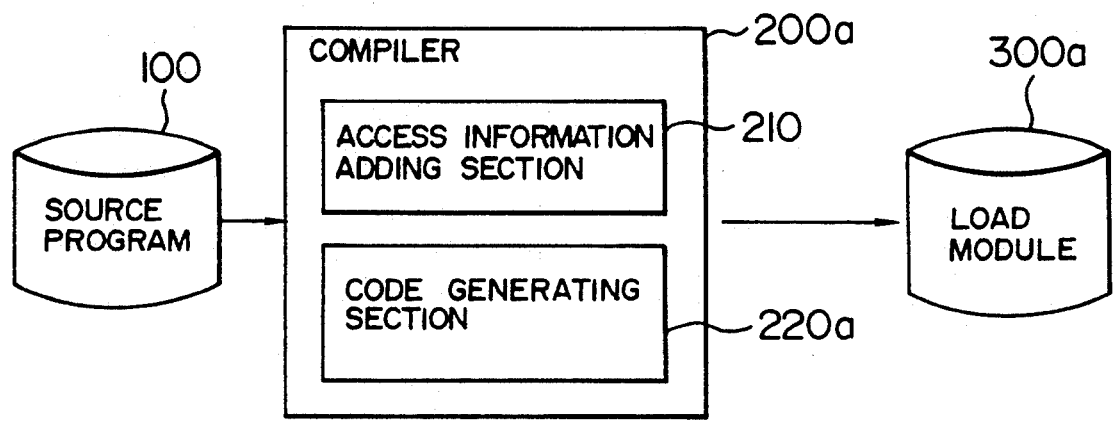
FIGS. 25A and 25B are conceptual diagrams of a computer and a trace data displaying tool of another embodiment of the present invention, respectively.

FIG. 25A shows the compiler based on another embodiment of this invention. In this embodiment, the load module is executed by a sequential processor system as shown in FIG. 1A.

A source program 100 is entered to the compiler 200a, and it is translated into a load module 300a. The compiler 200a includes an access information adding section 210 and a code generating section 220a which generates on object code for calling a trace data displaying tool 500a.

Figure 25B:
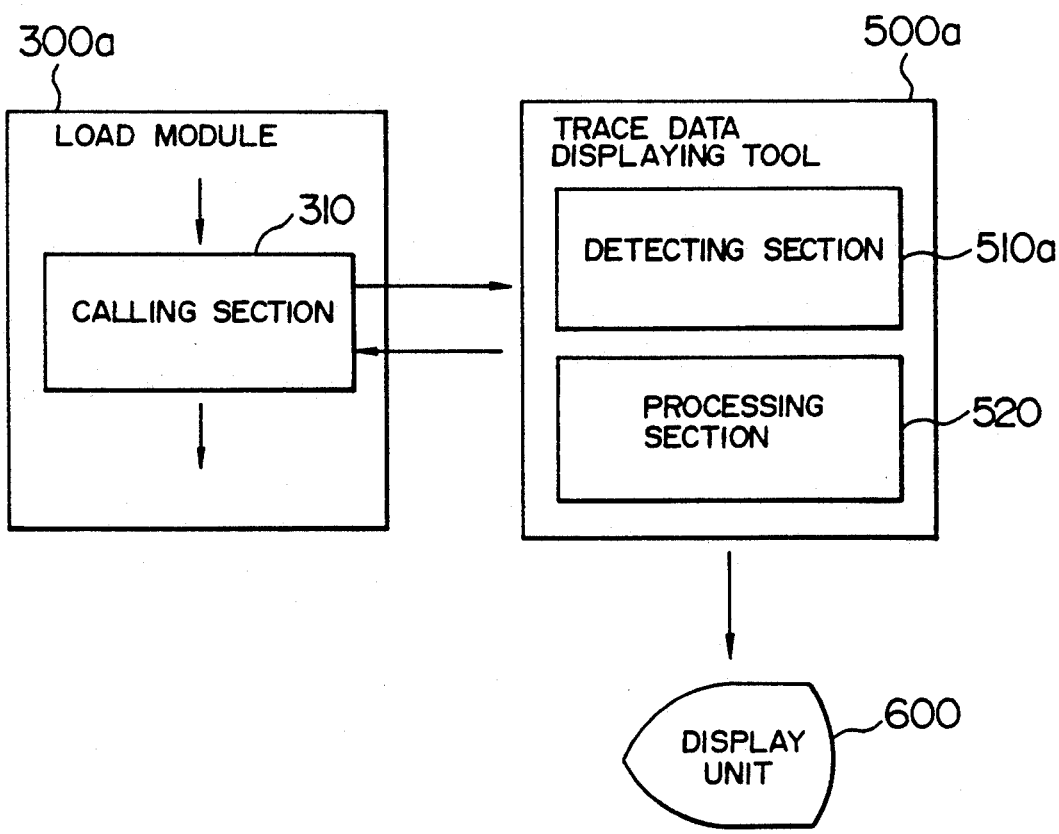

The section 210 has the same operation as the preceding counterpart 210 explained in connection with FIG. 2A. The section 220a generates an object code for calling the tool 500a for every statement by which an array element is defined or used, and adds the generated code into the load module 300a, as shown in FIG. 25B as a calling section 310. Accordingly, when the load module 300a outputted from the compiler 200a is executed, control is transferred to the tool calling section 310 each time the array element is accessed, as shown in FIG. 25B, and the tool 500a is initiated by it.

The trace data displaying tool 500a includes the detecting section 510a and the processing section 520. The detecting section 510a detects from an array accessed information record: the access type of the array element being processed currently, i.e., the current array element is definition or use, the subscript value of the current array element for each dimension, and a new access identifier NOWID, and delivers them to the processing section 520. The processing section 520 performs the same operation as the preceding processing section 520 shown in FIG. 4.

The embodiment shown in FIGS. 25A and 25B attains the same result as the embodiment shown in FIGS. 2A and 2B.

According to the foregoing embodiments of this invention, the possibility of erroneous access to array data in a source program for a parallel processor system or vector processor system is displayed as visual information, whereby the program can be debugged more easily.

In the access identifier storage, values other than zero are set for array elements that have been defined or used, and these values, therefore, can be used for the examination of undefined array elements.

Moreover, by choosing an array element in each display area, a statement number which has accessed the array element, subscript values and value of the array element in the source program can be displayed. In this case, it is also possible to display a statement of the source program corresponding to the statement number in high brightness.

I claim:

1. A method for testing a source program of a data processing system wherein a part of the source program is to be converted into a plurality of processes which are to be executed in parallel by a plurality of processors wherein each processor executes one of a plurality of processing types required by the source program part to be executed by an apparatus, the method steps comprising:

compiling the source program into an object program;

executing the object program;

generating an access information record each time an element of at least one test target array is processed for either a use or a definition, during execution of the object program, the access information record identifying at least (1) a subscript of the element, (2) one of the processing types used in processing the element and (3) whether the one processing type is the use or the definition of the element; and detecting whether the element of the at least one test target array prevents conversion of the source program part into the plurality of processes, depending upon the access information record generated for the element.

2. The method according to claim 1, wherein the detecting is based on the generated access information record and includes detecting whether the element of the at least one test target array prevents the conversion either when the element is defined in different processes of the plurality of processes or when the element is defined in a first process of the plurality of processes and is further used by a second process of the plurality of processes.

3. The method according to claim 1, further comprising the steps of:

converting the source program part into the plurality of processes based on the detecting; and, finding, before the converting, at least one source program statement included in the source program part, each of the found at least one source program statement processing the element of one of the at least one test target array for either use or definition;

wherein the converting further includes adding a test object program portion to an object program portion, representing one of the found at least one source program statement, the test object program portion generating a set of access information records regarding processing of the element upon executing the one of the found at least one source program statement to which the test object program portion is added, and wherein the generating step is executed as a result of executing the test object program portion included in the object program.

4. The method according to claim 3, wherein the detecting step is executed after the executing of the object program.

5. The method according to claim 4, further comprising storing, in parallel to the executing of the object program, the sets of access information records generated for at least one element of the at least one test target array;

wherein the detecting is executed based upon the stored sets of access information records after the executing of the object program.

6. The method according to claim 3, wherein the generating step is executed in parallel to the executing of the object program.

7. The method according to claim 6, wherein the detecting step comprises detecting whether the element of one of the at least one test target array prevents the source program to be converted into the plurality of processes, in response to generating the access information record for the element, depending upon a currently generated access information record and at least one previously generated access information record for the element.

8. The method according to claim 7, wherein the previously at least one generated access information record is the access information record generated most recently for the element.

9. The method according to claim 1, further comprising displaying results of the detecting for the at least one element of one of the at least one test target array in a matrix having elements corresponding to the at least one element of the one of the at least one test target array.

10. The method according to claim 1, wherein the executing includes executing the object program in such a manner that the plurality of processing types required by the source program part are sequentially executed.

11. The method according to claim 10, wherein the object program includes a plurality of portions which represent the plurality of processing types required by the source program part, and
wherein the executing includes sequentially executing the plurality of portions within the object program.

12. The method according to claim 11, wherein the source program part comprise a loop portion, and wherein the compiling step includes:
dividing the loop portion into a plurality of loop portions; and
converting the plurality of loop portions into corresponding object portions which are to be executed sequentially.

13. The method according to claim 1, wherein the executing includes executing the object program in such a manner that the plurality of processing types required by the source program part are parallelly executed.

14. The method according to claim 13, wherein the source program part comprises a lop portion,
wherein the compiling step includes:
determining loop iteration ranges during which the loop portion is to be executed for the plurality of processing types;
converting the source program into the object program which includes an object program portion representing the loop portion; and,
adding to the object program, information representing the determined loop iteration ranges, and
wherein the executing includes parallelly executing the plurality of processing types, based upon the object program portion representing the loop portion and the added information.

15. A method for testing at least one loop portion of a source program to be vectorized into an object program to be executed by vector processing for a vector processor of a data processing apparatus, the method comprising;
compiling the source program into the object program to be executed by a scalar processor;
executing the object program by the scalar processor;
generating an access information record each time an element of at least one test target array comprising at least one element within the source program to be tested is processed for either a use or a definition, during execution of the object program, the access information record identifying at least (1) a subscript of the element, (2) at least one source statement number associated with processing the element and (3) whether the processing is for the use or for the definition of the element; and
detecting whether the at least one element of the at least one test target array prevents vectorization at one of the at least one source statement number at which the at least one element is processed, depending upon a set of access information records generated for the at least one element.

16. The method according to claim 15, wherein the detecting step detects that the element of one of the at least one test target array prevents vectorization when the element is processed for use at a first source statement number before processing the element for definition at a second source statement number.

17. The method according to claim 15, further comprising the step of finding, before the compiling step, at least one source program statement included in the at least one loop portion of the source program, each of the found at least one source program statement processing the at least one element of one of the at least one test target array for either use or definition;
wherein the compiling step includes adding a test object program portion to an object program portion, the test object program portion representing the at least one source statement number which include the found at least one source program statement and generating the set of access information records regarding processing of the at least one element by one of the found at least one source program statement, and
wherein the generating step is executed as a result of executing each of the test program object portions included in the object program.

18. The method according to claim 17, wherein the detecting step is executed after executing the object program.

19. The method according to claim 18, further comprising storing, in parallel to executing the object program, the sets of access information records generated for the at least one element of the at least one test target array;
wherein the detecting step is executed based upon the stored sets of access information records after the executing of the object program.

20. The method according to claim 1, further comprising displaying an associating data associated with processing the element of one of the at least one test target array in accordance with the access information record generated for the element.

21. The method according to claim 20, further comprising storing a set of access information records, generated by the generating step, in a file, and wherein said displaying step includes retrieving said set of access information records for the at least one element from the file.

22. The method according to claim 20, wherein said displaying step is executed when the object program is being executed.

23. The method according to claim 20, wherein said displaying step includes displaying, as said associating data, an access type data representing whether processing of the at least one element is for use or for definition.

24. The method according to claim 20, wherein said set of access information records generated for one element of the at least one element further includes at least one of: a statement number at which the one element is processed; and
- a value of the one element, and said displaying step includes displaying, as said associating data, at least one of: the access type data representing whether the processing of the at least one element is for use or for definition;
- the statement number;
- the subscript data;
- and the value of the one element.

25. The method according to claim 24, wherein said displaying step further comprises displaying a statement of the source program in accordance with the statement number.

26. The method according to claim 20, wherein said displaying step includes displaying the associating data for the at least one element of a first test target array of the at least one test target array in a matrix manner.

27. The method according to claim 26, wherein the first test target array is n-dimensional (n is greater than or equal to 3), and said displaying step includes displaying said associating data for the elements in the matrix manner having a user-designated dimension of two.

28. A method for testing a program, comprising the steps of:
- generating an access information record for each access to a variable or to an element of an array as a target variable upon execution of an object program to be tested, the object program including a plurality of processing types comprising a use processing type and a defining processing type, in which said target variable is access, each access information record comprising an identifier assigned to each of the plurality of processing types and an access type data representing whether said target variable is used or defined during the access to said target variable; and,
- determining from said access information records generated whether or not the use processing type processing said target variable coincides with the defining processing type for said target variable or whether or not the use processing type precedes the defining processing type.

29. A method according to claim 28, further comprising displaying an associating data associated with each access to said target variable in accordance with the generated access information records.

30. The method according to claim 29, wherein said access information record further includes at least one statement number at which said target variable is accessed, a subscript data representing the target variable and a value of said target variable to be accessed, said displaying step includes displaying, as said associating data, at least one of data representing accesses to said target variable, the at least one statement number, the subscript data and the value.

31. The method according to claim 30, wherein said displaying step further comprises displaying a statement of the source program in accordance with the statement number, in addition to or in place of said associating data when said generated access information record includes the statement number.

32. The method according to claim 30, wherein said access information record further includes the subscript data representing said target variable of the array, and said displaying step displays said associating data in a matrix manner when the array is n-dimensional (n=1 or 2), and displays said associating data in the matrix manner having a user-designated dimension of two when the array is n-dimensional (n is greater than or equal to 3).

33. The method according to claim 29, wherein said displaying step includes displaying, as said associating data, data representing each access to said target variable.

34. A method of compiling a plurality of source program statements of a source program comprising the steps of:
- translating the source program into an object program, wherein the source program statements of the source program are translated into a plurality of object program portions corresponding to a plurality of processing types under a predetermined condition;
- adding a first object code for assigning an identifier to each of said object program portions; and,
- adding a second object code to said object program for generating an access information comprising said identifier each time a predesignated array is accessed during execution of said object program.

35. The method according to claim 34, wherein said translating step causes said adding step to execute while translating said source program statements under said predetermined condition.

36. The method according to claim 34, wherein said identifier is a number assigned to each source program statement of said source program.

37. The method according to claim 34, further comprising adding to said object program a third object code for calling a program testing tool for testing a possibility of erroneous access to said predesignated array, and wherein said access information further includes an access type data indicative of whether the access of said predesignated array is a definition or a use, and said program testing tool tests the possibility of erroneous access to said predesignated array in accordance with a definition identifier and a use identifier, said definition and said use identifiers respectively representing identifiers in said access information generated at the definition and the use of said predesignated array.

38. The method according to claim 37, further comprising displaying an error data indicative of the possibility of erroneous access to said predesignated array in accordance with said access information.

39. The method according to claim 38, wherein said access information for an element of said predesignated array further includes at least one source program statement number associated with the element, a subscript data for specifying the element, and a value of the element, and said error data includes the at least one source program statement number, said subscript data and said value.

40. The method according to claim 38, wherein said access information further includes said at least one source program statement number, and said error data includes said plurality of source program statements designated by said at least one source program statement number.

41. The method according to claim 38, wherein said program testing tool displays a currently executed source program statement with a first color and displays a source program statement not currently executed in a second color, wherein the first color is different from the second color or has a higher brightness.

42. The method according to claim 38, wherein said access information further includes a subscript data for specifying an element of said predesignated array, and said program testing tool displays said error data in a matrix having at least a one or two dimensional structure in accordance with said subscript data.

43. The method according to claim 42, wherein said program testing tool displays said error data in accordance with a dimension specified by a user for the one- or two- dimensional matrix in accordance with the subscript data, when said array is n-dimensional (where n is greater than or equal to 3).

44. The method according to claim 37, wherein said program testing tool judges the possibility of erroneous access by deciding whether or not said definition identifier corresponds with said use identifier.

45. The method according to claim 37, wherein said translation step includes dividing said source program statements in correspondence with said plurality of processing types, each processing type being assigned with the source program statement number as said identifier, and said program testing tool judging the possibility of erroneous access by deciding whether or not said definition identifier is greater than said use identifier.

46. A method for testing a source program executed by a data processing apparatus wherein a part of the source program is to be converted into a plurality of processes corresponding to a plurality of processing types, the method comprising:

compiling the source program into an object program;

executing the object program;

generating at least one access information record for each access to at least one predetermined target array comprising at least one element during execution of the object program, each access information record identifying at least (1) a subscript of a first element of the at least one element, (2) the processing type which has accessed the first element and (3) whether the access is a use or a definition of the first element; and detecting whether or not conversion of the source program part into the plurality of processes is prevented, depending upon the generated access information records.

47. The method according to claim 46, wherein the detecting step includes detecting whether the first element prevents the conversion, based on the generated at least one access information record, either when the first element is defined by a first process of the plurality of processes and is defined by a second process of the plurality of processes wherein the first process and the second process are different, or when the first element is defined by the first process and is further used by the second process.

48. The method according to claim 46, further comprising:

converting the source program part into the plurality of processes based on the detecting result; and, finding, before the converting step, at least one source program statement included in the source program part, each of the found at least one source program statement processing a single element of one of the at least one predetermined target array for either use or definition, and wherein the converting step further includes adding a test program portion to an object program portion representing one of the found at least one source program statement, the test object program portion generating the at least one access information record for each access to the single element by one of the found at least one source program statement in response to execution of the object program portion.

49. The method according to claim 46, further comprising displaying results of the detecting step for the at least one element of a first predetermined target array of the at least one predetermined target array in a matrix whose elements correspond to the at least one element of the first predetermined target array.

50. The method according to claim 46, wherein the executing step includes executing the object program such that the plurality of processes required by the source program part are sequentially executed.

51. The method according to claim 46, wherein the executing step includes executing the object program such that the plurality of processes required by the source program part are parallelly executed.

52. The method according to claim 46, further comprising displaying an associating data associated with an access to the at least one element of the at least one predetermined target array in accordance with the generated at least one access information record.

53. The method according to claim 52, wherein said displaying step includes displaying, as said associating data, a data representing an access type data for the at least one element of the at least one predetermined target array representing whether the at least one element is used or defined.

54. The method according to claim 52, wherein said at least one access information record generated for the first element further comprises a statement number at which the first element is accessed, and a value of the first element; said displaying step includes displaying, as said associated data, an access type data representing whether the first element is used or defined, the statement number, a subscript data of a test array corresponding to the first element and the value of the first element.

55. The method according to claim 54, wherein said displaying step further comprises displaying a statement of the source program represented by the statement number for the first element, in addition to said associating data.

56. The method according to claim 52 wherein said displaying step includes displaying the associating data for at least one element of a first test target array of the at least one predetermined target array in a matrix manner.

57. The method according to claim 56, wherein the first test target array is n-dimensional (n is greater than or equal to 3), and said displaying step includes displaying said associating data for the at least one element of the first test target array in a matrix manner having a user-designated dimension of two.

* * * * *